No. 778,149. PATENTED DEC. 20, 1904.
W. B. SIMONS.
APPARATUS FOR TREATING PYRITES.
APPLICATION FILED DEC. 5, 1903.
NO MODEL. 2 SHEETS—SHEET 2.
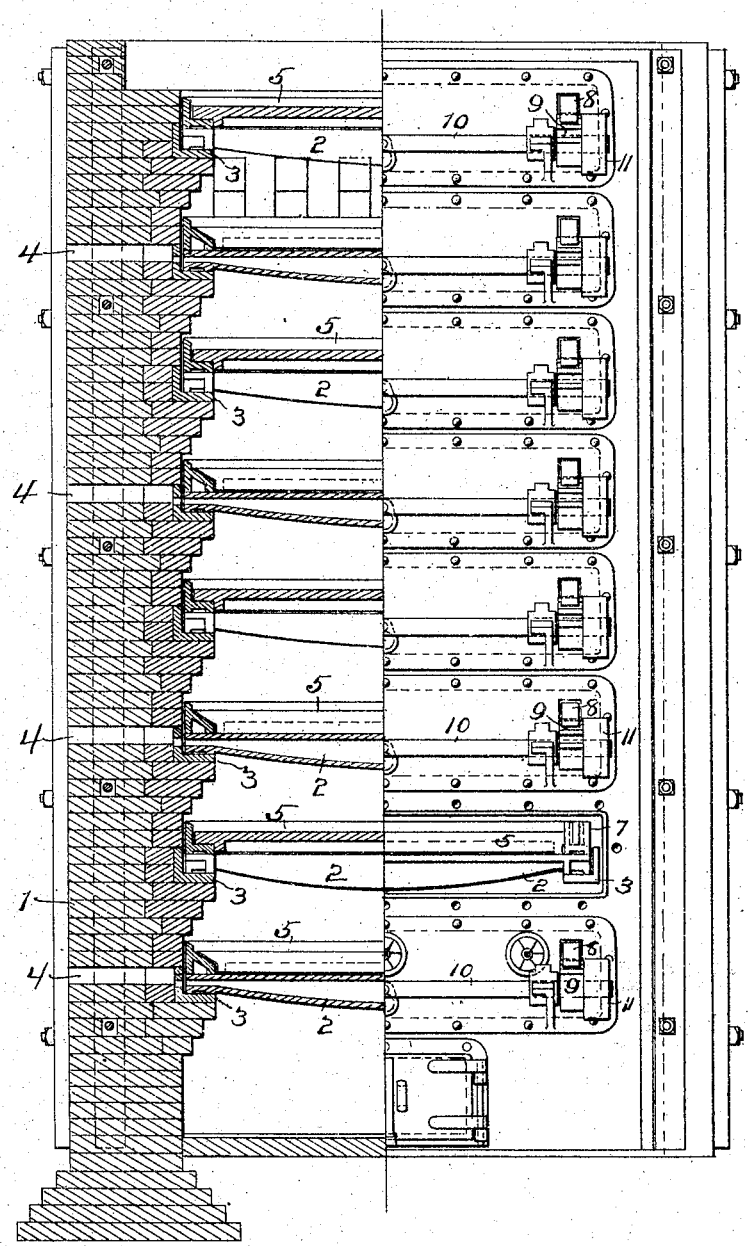
WITNESSES
INVENTOR
W. B. Simons
By H. A. Seymour
Attorney No. 778,149. Patented December 20, 1904.

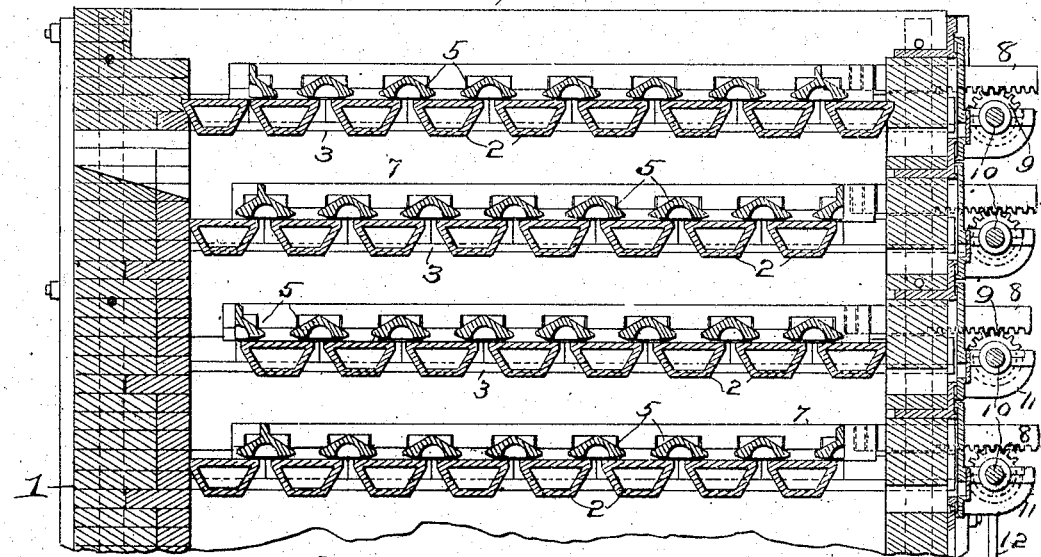
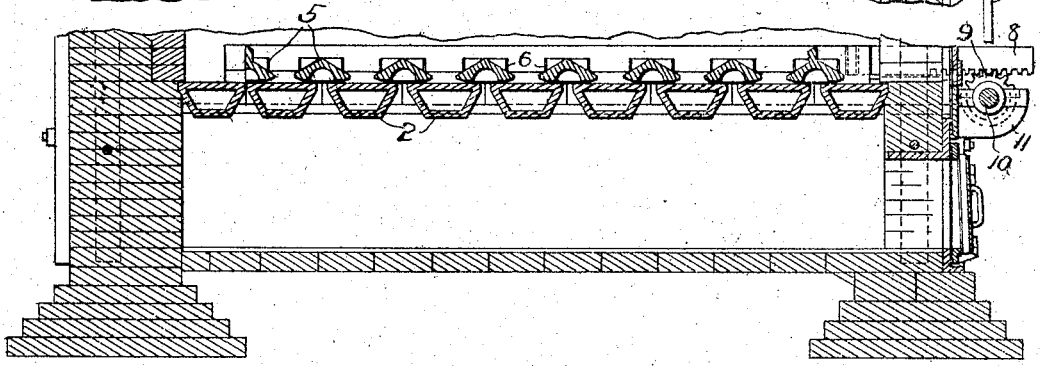
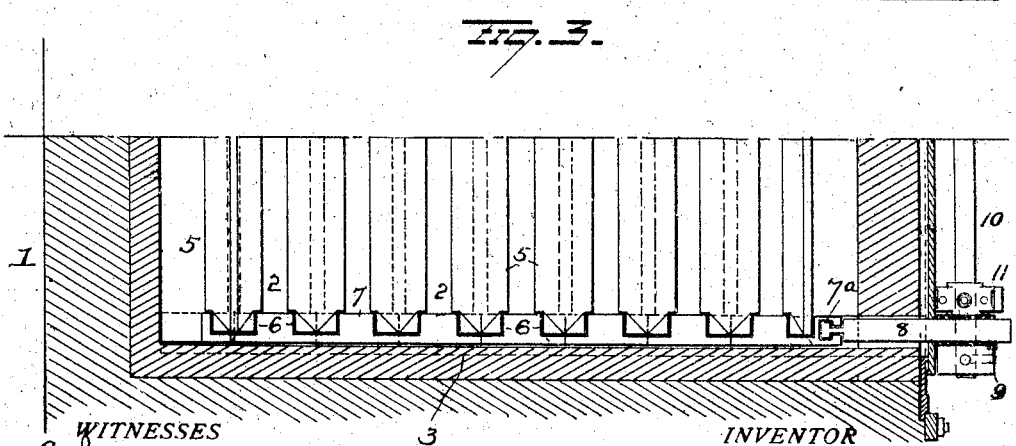

UNITED STATES PATENT OFFICE.

WILLIAM BAYNARD SIMONS, OF CHARLESTON, SOUTH CAROLINA.

APPARATUS FOR TREATING PYRITES.

SPECIFICATION forming part of Letters Patent No. 778,149, dated December 20, 1904.

Application filed December 5, 1903. Serial No. 183,948.

*To all whom it may concern:*

Be it known that I, WILLIAM BAYNARD SIMONS, a resident of Charleston, in the county of Charleston and State of South Carolina, have invented certain new and useful Improvements in Apparatus for Treating Pyrites; and I do hereby declare the following to be a full, clear, and exact description of the invention, such as will enable others skilled in the art to which it appertains to make and use the same.

My invention relates to apparatus for treating pyrites, the object of the invention being to so construct such an apparatus as to facilitate the driving off of the sulfur fumes for the manufacture of commercial sulfuric acid.

With this object in view the invention consists in certain novel features of construction and combinations of parts, as hereinafter set forth, and pointed out in the claims.

In the accompanying drawings, Figure 1 is a view in vertical section, illustrating one set of grate-bars in plan; and Fig. 2 is a view at right angles to Fig. 1, illustrating one-half in section and one-half in elevation. Fig. 3 is a transverse sectional view of a portion of the apparatus.

1 represents the casing of masonry, and 2 represents a series of superposed grates therein, which will now be described in detail.

Each grate 2 comprises a series of hollow grate-bars, preferably of the general shape in cross-section shown in Fig. 1 and supported at their ends on a channel-iron frame 3, which latter is made with openings 4 in alinement with openings in the casing-wall 1 and with the open ends of the hollow grate-bars 2 to permit a free circulation of air through the grate-bars. The bars 2 are spaced a suitable distance apart, and said spaces are normally closed by rake-bars 5 of the general arched shape shown in cross-section and having beveled sides converging to a raised sharp edge on their upper face. The ends of these rake-bars 5 are carried in pockets 6 in a frame 7, and the latter at its forward ends is mortised to receive tenons 7ª on the ends of rack-bars 8, which latter project through the front of casing 1 and engage pinions 9 on a shaft 10, mounted in suitable bearings 11, and with which shaft 10 a suitable lever 12 is connected and adapted to turn the same and move the rake-bars, as will be hereinafter explained, and it will be understood that the above description of one grate and rake applies alike to all.

The apparatus will be started by firing the same with wood or other fuel until heat enough shall have been obtained to set fire to the pyrites. The pyrites will be introduced into the top of the apparatus and caused while burning to pass from one grate to the next. The pyrites are burned in the apparatus for the purpose of driving off the sulfur fumes for the manufacture of commercial sulfuric acid. To effectually accomplish this, it is important that the pyrites shall while burning be frequently agitated in order to effect complete combustion of the pyrites. By providing a series of grates or slotted platforms one above the other and showering the burning pyrites from one to the other ample opportunity is given for the escape of sulfur fumes, and by providing means for stirring the burning pyrites complete combustion of the same will be effected and a maximum amount of sulfur fumes will be recovered. The sulfur may be collected and conveyed from the apparatus in any suitable manner.

When it is desired to stir or dump the pyrites from a grate to the next lower, the operator swings lever 12 to turn shaft 10 and pinions 9, which latter move rack-bars 8 and frame 7 longitudinally to draw the rake-bars 5 from over the space between grate-bars 2 and dispose them above the grate-bars, and owing to the beveled shape of the rake-bars the pyrites will be directed by them between the grate-bars 2 down upon the next lower grate. The rake-bars 5 can then be moved back to their former position over the spaces between the grate-bars to receive and support pyrites from the grate above. By this arrangement of grate and rake bars the burning pyrites can be stirred or transferred step by step from grate to grate to facilitate the recovery of sulfur fumes until the bottom of casing 1 is reached, when the pyrites will have been consumed and exhausted.

A great many slight changes might be made in the general form and arrangement of the several parts described without departing from my invention, and hence I do not restrict myself to the precise details set forth, but consider myself at liberty to make such changes and alterations as fairly fall within the spirit and scope of my invention.

Having fully described my invention, what I claim as new, and desire to secure by Letters Patent, is—

1. In apparatus for treating pyrites for the recovery of sulfur fumes, the combination with a furnace, of two or more series of bars, the bars of each series spaced apart, and said series of bars disposed, one series above and spaced from another, and means for stirring pyrites on one series of bars and causing the same while burning, to descend to the next lower series of bars.

2. In apparatus for treating pyrites for the recovery of sulfur fumes, the combination with a furnace, of a plurality of series of bars disposed one above another and spaced apart, the bars of each series spaced apart, and a rake or stirrer over each series of bars.

3. In apparatus for treating pyrites for the recovery of sulfur fumes the combination with a furnace, of a plurality of superimposed series of bars, each series spaced from the others and the bars of each series made hollow and spaced apart, a connected series of stirrers over each series of bars, and means for operating said stirrers.

In testimony whereof I have signed this specification in the presence of two subscribing witnesses.

W. BAYNARD SIMONS.

Witnesses:
   ROBERT M. MEANS,
   K. K. HUGER.